United States Patent
Ishigami et al.

(10) Patent No.: US 8,052,201 B2
(45) Date of Patent: Nov. 8, 2011

(54) FLOOR STRUCTURE OF CABIN

(75) Inventors: Tateo Ishigami, Fujisawa (JP); Ichio Koike, Fujisawa (JP); Akihiro Yuuki, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 194 days.

(21) Appl. No.: 12/446,210

(22) PCT Filed: Oct. 15, 2007

(86) PCT No.: PCT/JP2007/070054
§ 371 (c)(1),
(2), (4) Date: Apr. 17, 2009

(87) PCT Pub. No.: WO2008/047747
PCT Pub. Date: Apr. 24, 2008

(65) Prior Publication Data
US 2010/0320803 A1  Dec. 23, 2010

(30) Foreign Application Priority Data
Oct. 20, 2006 (JP) .................. 2006-286565

(51) Int. Cl.
*B62D 33/07* (2006.01)
(52) U.S. Cl. ............... 296/190.08; 296/190.06
(58) Field of Classification Search ............. 296/190.05, 296/190.06, 203.04, 204, 190.08
See application file for complete search history.

(56) References Cited

U.S. PATENT DOCUMENTS

| | | | | |
|---|---|---|---|---|
| 3,423,122 A | * | 1/1969 | Wessells | 296/203.01 |
| 3,985,194 A | * | 10/1976 | Knutson | 180/89.15 |
| 4,085,960 A | * | 4/1978 | Sherman | 296/190.06 |
| 4,747,636 A | * | 5/1988 | Harasaki et al. | 296/181.4 |

FOREIGN PATENT DOCUMENTS

| | | |
|---|---|---|
| JP | 62-43977 A | 3/1987 |
| JP | 10-129531 A | 5/1998 |
| JP | 10-278845 A | 10/1998 |

* cited by examiner

*Primary Examiner* — Dennis Pedder

(57) ABSTRACT

Provided is a floor structure 11 disposed on a chassis frame and equipped with a bed 23 behind a driver's seat 21. The floor structure includes a floor panel 12 and a reinforcement member 13. The floor panel 12 includes: a front-side floor portion 16 that extends rearwards from a bottom portion of a front edge of a cabin 3 and includes a seat-attachment portion 22 supporting the seat 21 from below; a rising portion 17 that is bent at the rear edge of the front-side floor portion 16 and extends upwards; and a rear-side floor portion 18 that is bent at the upper edge of the rising portion 17 and extends rearwards, and that includes a bed-attachment portion 24 on which the bed 23 is mountable. The reinforcement member 13 is opposed to the bottom surface of the rear-side floor portion 18, and is joined to the bottom surface of the rear-side floor portion 18 and at least any one of the bottom surface of the front-side floor portion 16 and the rear surface of the rising portion 17 so that the reinforcement member 13 can define and form a structure having a closed cross-section together with the rear-side floor portion 18.

4 Claims, 4 Drawing Sheets

FLOOR STRUCTURE OF CABIN

TECHNICAL FIELD

The present invention relates to a floor structure of a cabin that includes a bed behind a driver's seat.

BACKGROUND ART

A conventional floor structure of a cabin that includes a bed behind a driver's seat is described, for example, in Patent Document 1. The structure in Patent Document 1 includes a floor pan (floor panel) that forms the floor of the cabin. The floor pan includes: a central portion which is located substantially at the center of the vehicle; two side portions which are provided respectively at both sides, in the vehicle-width direction, of the central portion and on which seats for occupants can be installed; and a horizontal portion which is joined to the rear edges of the central portion and of the two side portions and on which a bed for the occupants can be mounted. The floor pan is disposed on a main sill. The main sill includes: parallel portions which are fixed respectively to the bottom surfaces of the two side portions and extend from the front edges of the two side portions to the horizontal portion; and a base portion which is continuously connected to the rear edges of the parallel portions and is fixed to the bottom surface of the horizontal portion of the floor pan so as to extend in the vehicle-width direction.

Patent Document 1: JP-A 10-129531

DISCLOSURE OF THE INVENTION

Problems to be Solved by the Invention

In the structure disclosed in Patent Document 1, the bottom portion of the rear edge of the cabin (below the position where the bed is placed) is reinforced by the base portion of the main sill disposed so as to extend in the vehicle-width direction at the rear-edge portion of the horizontal portion on which the bed is mounted.

A reinforcement member or the like arranged to the floor pan so as to extend in the vehicle-width direction contributes, in general, to an increase in the torsional stiffness of the cabin as a whole, and to the assurance of driving stability of the vehicle. In the structure in Patent Document 1, however, the base portion of the main sill is simply fixed only to the rear-edge portion of the horizontal portion of the floor pan. Accordingly, if the base portion can provide only insufficient reinforcement, it is difficult to secure the torsional stiffness high enough for the cab.

Such inconvenience is avoidable if the base portion that is to be fixed to the bottom surface of the horizontal portion of the floor pan is made of a thicker plate, or if the base portion is made to have a larger width in the front-to-rear direction of the vehicle. The use of such a large base portion, however, results in an increase in the weight of the vehicle.

In addition, a power source, such as an engine, and tires are commonly arranged below the floor pan. Accordingly, if a member, such as a board, to prevent the transmission of noise is not provided between the floor pan and the power source or the tires, the noise produced by the power source or the tires during the travelling of the vehicle arrives directly at the floor panel and then are transmitted to the inside of the cabin via the floor panel. For this reason, if no such member is disposed below the horizontal portion on which the bed is mounted as in the case of the structure disclosed in Patent Document 1, the noise produced during the travelling of the vehicle is transmitted to the bed via the horizontal portion, and thereby lowers occupant comfort on the bed.

Accordingly, the present invention aims to provide a floor structure of a cabin capable of securing the torsional stiffness of the cabin as a whole and, at the same time, of providing better occupant comfort on a bed.

Means for Solving the Problems

To accomplish the above-mentioned aims, the present invention provides a floor structure of a cabin disposed on a chassis frame and equipped with a bed behind a driver's seat. The floor structure includes a floor panel and a reinforcement member. The floor panel includes: a front-side floor portion that extends rearwards from a bottom portion of a front edge of the cabin and includes a seat-attachment portion supporting the seat from below; a rising portion that is bent at the rear edge of the front-side floor portion and extends upwards; and a rear-side floor portion that is bent at the upper edge of the rising portion and extends rearwards, and that includes a bed-attachment portion on which the bed is mountable. The reinforcement member is opposed to the bottom surface of the rear-side floor portion, and is joined to the bottom surface of the rear-side floor portion and at least anyone of the bottom surface of the front-side floor portion and the rear surface of the rising portion so that the reinforcement member can define and form a structure having a closed cross-section together with the rear-side floor portion.

With the above-described configuration, the bed is disposed on the rear-side floor portion that extends in the vehicle-width direction of the vehicle behind the driver's seat. Under the rear-side floor portion, the reinforcement member is disposed so as to be opposed to the bottom surface of the rear-side floor portion and to define and form a structure having a closed cross-section with the rear-side floor portion. Accordingly, the structure with a closed cross-sectional shape formed in the vehicle-width direction has a relatively large width in the front-to-rear direction of the vehicle. For this reason, such a structure can reliably increase the torsional stiffness of the cabin as a whole. In addition, since the torsional stiffness of the cabin as a whole is secured by forming the structure with the closed cross-sectional shape under the rear-side floor portion, the floor structure can be a structure that reduces the increase in the weight.

The structure with the closed cross-section is defined by and formed between the reinforcement member and the bottom surface of the rear-side floor portion on which the bed is mounted. Accordingly, the noise which is produced by the power source, such as an engine, by the tires, and the like during the travelling of the vehicle and which is to be transmitted is, firstly, blocked effectively by the reinforcement member, and then arrives at the bed via the rear-side floor portion. For this reason, the level of the noise transmitted to the bed can be lowered down. Accordingly, occupant comfort on the bed can be improved. In addition, it is not necessary to provide a separate member, such as a board, below the rear-side floor portion for the purpose of preventing the transmission of the noise. Accordingly, a reduction in the number of component parts can be expected.

In addition, the reinforcement member that defines and forms the structure with the closed cross-section together with the rear-side floor portion is disposed under the rear-side floor portion on which the bed is mounted. Accordingly, the position where the reinforcement member is disposed has no influence on the width dimension, in the front-to-rear direction of the vehicle, of the rear-side floor portion, that is, on the width dimension, in the front-to-rear direction of the vehicle, of the bed. For this reason, it is possible to secure the width dimension, in the front-to-rear direction of the vehicle, of the bed. As a consequence, occupant comfort on the bed can be improved.

In addition, since the rear-side floor portion on which the bed is mounted is bent at the upper edge of the rising portion and then extends rearwards, the bed can have a uniform thickness. Accordingly, the cushioning performance of the bed (sleeping comfort), such as the elasticity and the ability to recover the original form of the bed, can be made uniform. As a consequence, it is possible to make sure of occupant comfort on the bed.

In addition, the bottom portion of the front edge of the cabin may be rotatably supported by the front-edge portion of the chassis frame, and the reinforcement member may include a lock mechanism that connects the cabin to the chassis frame so as to engage with and disengage from the chassis frame freely.

In the above structure, the reinforce member disposed on the rear-edge side of the floor panel is provided with the lock mechanism which connects the tiltable cabin to the chassis-frame rails so as to engage with and disengage from the chassis-frame rails. To put it differently, since the lock mechanism is provided to the reinforcement member capable of increasing the torsional stiffness of the cabin as a whole by being joined to the floor panel, the strength with which the lock mechanism is attached to the cabin 3 can be reliably increased.

Further, the reinforcement member in which the lock mechanism is provided is formed as a separate body from the floor panel. Accordingly, only the plate thickness of the reinforcement member can be set to be large enough to satisfy the support strength of the lock mechanism without provoking any increase in the thickness of the floor panel.

Effects of the Invention

According to the present invention, with only a simple configuration, the torsional stiffness of the cabin as a whole can be reliably increased and occupant comfort on the bed can be reliably improved.

EXPLANATION OF REFERENCE NUMERALS

Figure 1:
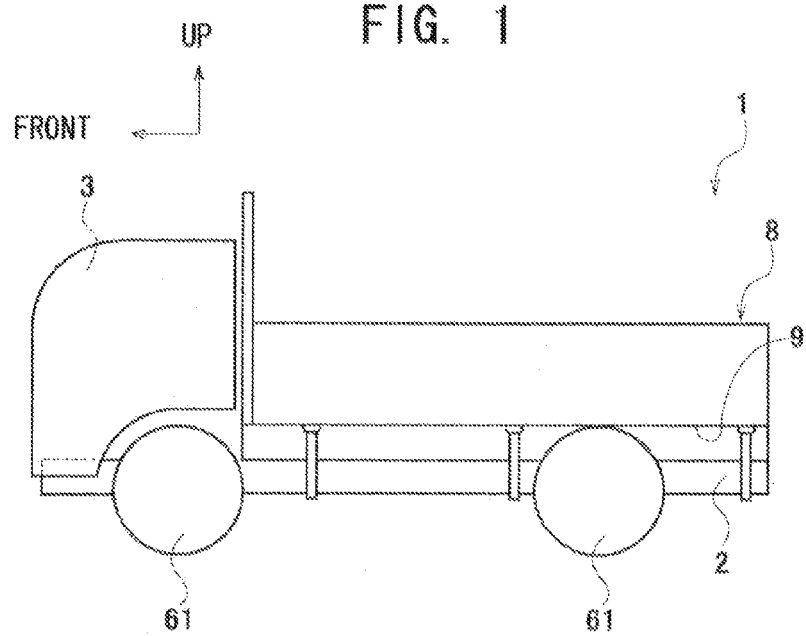
FIG. 1 is a side elevation of a cab-over truck of an embodiment.

1 cab-over truck
2 chassis-frame rails
3 cabin
11 floor structure
12 floor panel
13 reinforcement member
16 front-side floor portion
17 rising portion
18 rear-side floor portion
21 seat
22 seat-attachment portion
23 bed
24 bed-attachment portion
31 lock mechanism
32 striker (lock mechanism)

BEST MODE FOR CARRYING OUT THE INVENTION

Figure 2:
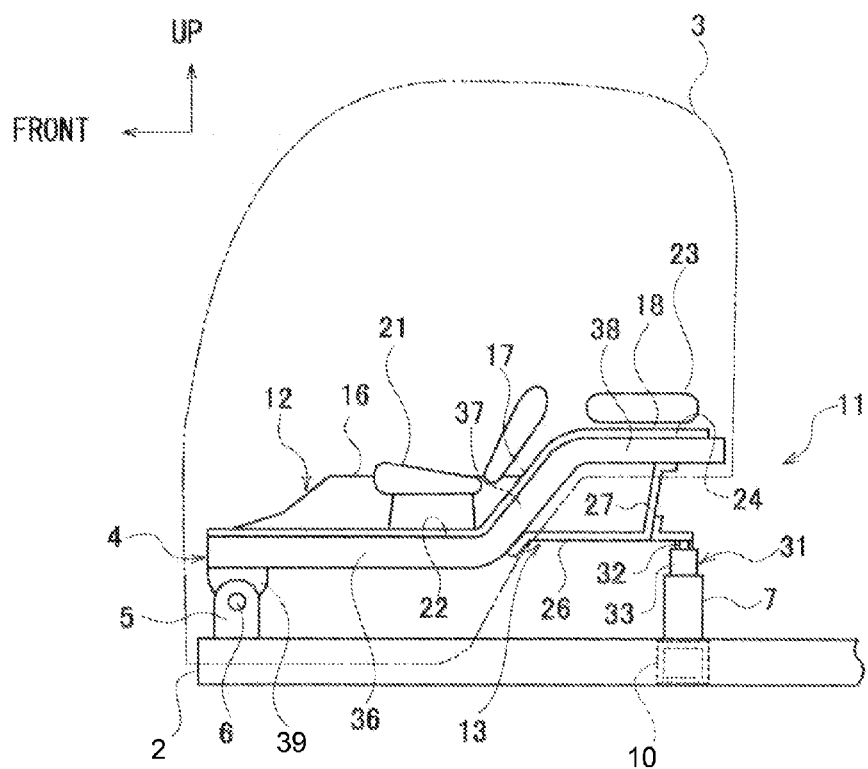
FIG. 2 is a schematic side elevation illustrating, in an enlarged manner, a principal portion of FIG. 1.
Figure 3:
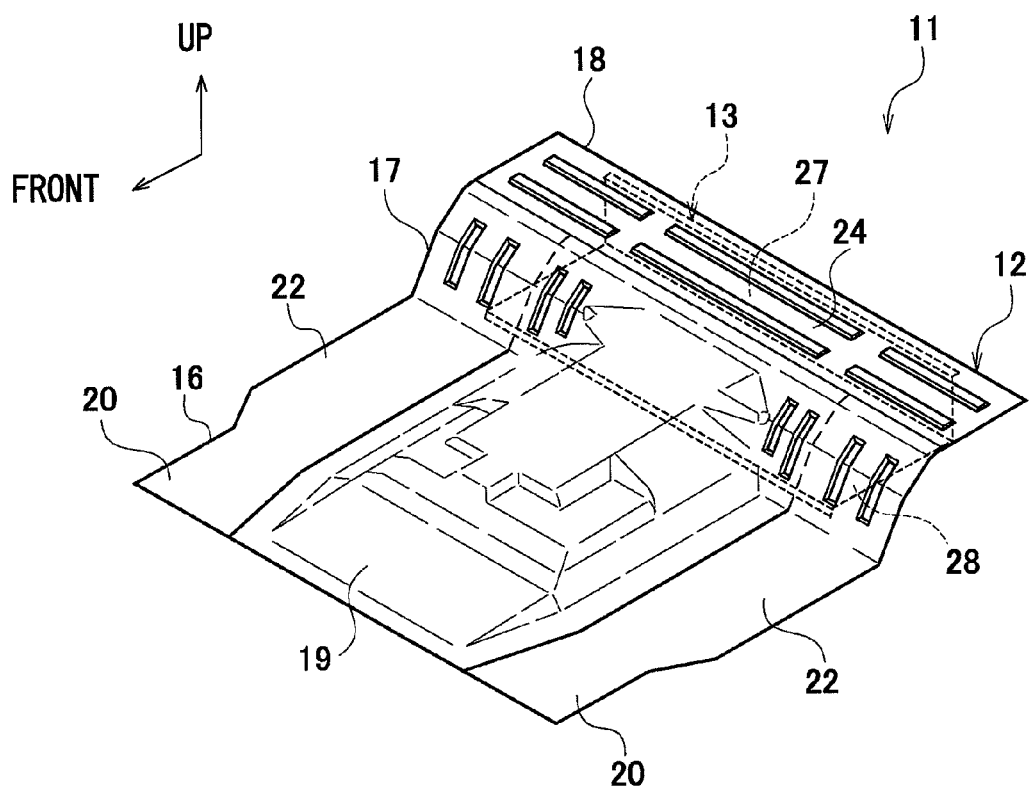
FIG. 3 is a perspective view of a floor panel.
Figure 4:
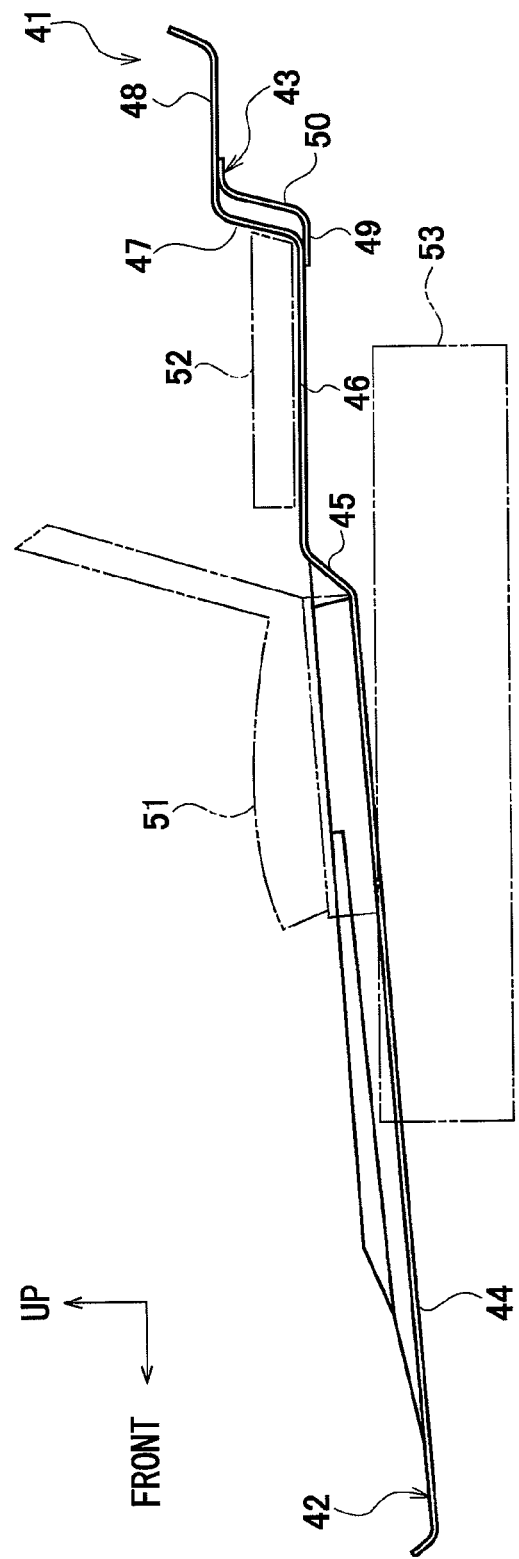
FIG. 4 is a side elevation of a floor structure different from a floor structure according to the present invention.
Figure 5:
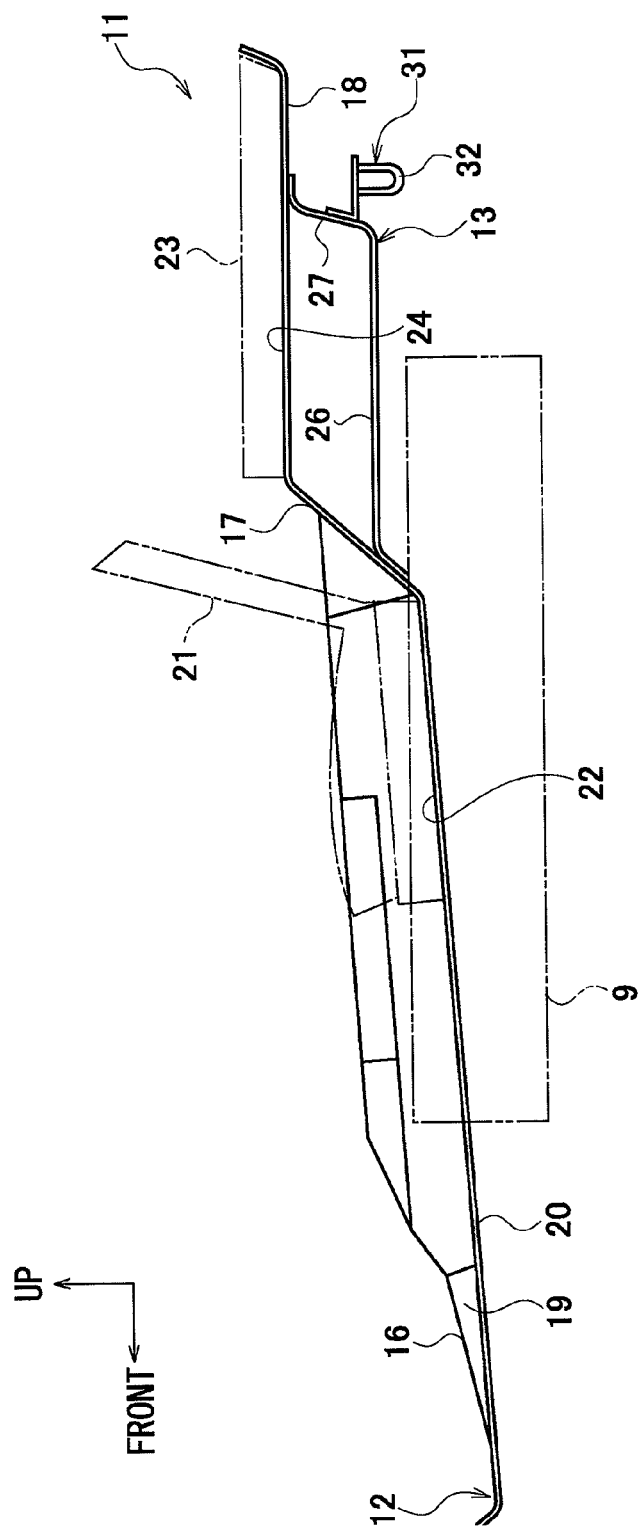
FIG. 5 is a side elevation illustrating the floor structure according to the present invention.

An embodiment of the present invention will be described below with reference to the drawings. FIG. 1 is a side elevation of a cab-over truck of this embodiment. FIG. 2 is a schematic side elevation illustrating, in an enlarged manner, a principal portion of FIG. 1. FIG. 3 is a perspective view of a floor panel. FIG. 4 is a side elevation of a floor structure different from a floor structure according to the present invention. FIG. 5 is a side elevation illustrating the floor structure according to the present invention. Note that "FRONT" in the drawings indicates the front side of the vehicle, and "UP" indicates the upside of the vehicle. In addition, right and left directions mentioned in the following description refer respectively to the right-hand direction and the left-hand direction for the viewer facing the front side of the vehicle.

As FIGS. 1 and 2 shows, a cab-over truck 1 includes: chassis-frame rails 2 extending, in the front-to-rear direction of the vehicle, respectively on the two sides, in the vehicle-width direction, of the vehicle; a cabin 3 supported, from below, over a front-side portion of the chassis-frame rails 2; cab under-members 4 supporting the cabin 3 from below; a loading platform 8 supported, from below, over a rear-side portion of the chassis-frame rails 2.

Each of the chassis-frame rails 2 has a substantially-rectangular closed cross-sectional shape. Front-cab mounts 5 are respectively fixed by welding or the like to the front edge portions of the chassis-frame rails 2. The front-cab mounts 5 rotatably support respectively rotationally-supporting portions 39 of the cab under-members 4 to be described later. Plural cross members 10 are each provided between the chassis-frame rails 2 to extend in the vehicle-width direction. A rear cab-mounting bracket 7 is provided so as to stand on one of the plural cross members 10 that is provided at a predetermined position. The rear cab-mounting bracket 7 is located substantially at the center, in the vehicle-width direction, of the cross member 10.

As FIG. 2 shows, the cabin 3 has a floor structure 11 that forms the floor portion of the vehicle interior space. The floor structure 11 includes a floor panel 12 and a reinforcement member 13 that has a substantially L-shaped cross section.

The front edge of the cabin 3 is supported by tilt shafts 6 of the front-cab mounts 5 by using the rotationally-supporting portions 39 of the cab under-members 4 to be described later so that the cabin 3 can tilt freely. The rear edge of the cabin 3 is supported by the rear cab-mounting bracket 7 with a lock mechanism 31 to be described later so that the rear edge of the cabin 3 can engage with or disengage from the rear cab-mounting bracket 7 freely.

As FIGS. 3 and 5 show, the floor panel 12 includes: a front-side floor portion 16 which extends rearwards from the bottom portion of the front edge of the cabin 3 (see FIG. 2); a rising portion 17 which is bent at the rear edge of the front-side floor portion 16 and then extends obliquely upwards; and a rear-side floor portion 18 which is bent at the upper edge of the rising portion 17 and then extends to the rear side of the vehicle substantially horizontally. These members are fixed together by welding, by being fastened with bolts, or by other means.

The front-side floor portion 16 includes: a center floor panel 19 which is provided at the center in the vehicle-width direction; and side floor panels 20 which respectively extend substantially horizontally in directions opposite to each other from the two edges, in the vehicle-width direction, of the center floor panel 19. These members are fixed together by welding, by being fastened with bolts, or by other means. The center floor panel 19 has a substantially U-shaped cross section. A driving source 9, such as an engine, is disposed under the center floor panel 19. The side floor panels 20 respectively have seat-attachment portions 22 capable of supporting seats 21, with bolts or the like, on the top surfaces thereof, respectively.

The rear-side floor portion 18 includes a bed-attachment portion 24 capable of placing a substantially horizontal bed 23 on the top surface thereof. The power source 9 is disposed under the rear-side floor portion 18.

Note that the floor panel 12 of this embodiment is formed by separate members but, instead, the floor panel can be formed integrally.

The reinforcement member 13 has a substantially L-shaped cross section, and is disposed under the floor panel 12 and between the cab under-members 4 (see FIG. 2). The reinforcement member 13 includes: a horizontal portion 26 which is a substantially plate-shaped portion provided so as to extend substantially horizontally; and a bent portion 27 which is bent at the rear edge of the horizontal portion 26 and then extends obliquely upwards. The front edge of the horizontal portion 26 is fixed, by welding or the like, to a predetermined position on the rear-side surface of the rising portion 17. The upper edge of the bent portion 27 is fixed, by welding or the like, to a predetermined position on the bottom surface of the rear-side floor portion 18. Note that the front edge of the horizontal portion 26 is fixed to the rear-side surface of the rising portion 17, but may be fixed to the bottom surface of the rear-side floor portion 18.

With the reinforcement member 13 fixed to the floor panel 12, the top surface of the horizontal portion 26 is opposed to the bottom surface of the rear-side floor portion 18. A structure with a closed cross-section is thus defined by and formed between the reinforcement member 13 and the rear-side floor portion 18, and extends in the vehicle-width direction.

A substantially U-shaped striker (lock mechanism) 32 that forms a part of the lock mechanism 31 to be described later is fixed to a predetermined position on the rear-side surface of the bent portion 27. The striker 32 is fixed there by welding, by being fastened with bolts, or by other means so as to face downwards.

As FIGS. 2 and 5 show, the lock mechanism 31 includes: the striker 32 provided on the reinforcement member 13 side; and a lock member 33 fixed to the upper portion of the rear cab-mounting bracket 7 by welding, by being fastening with bolts, or by other means. The lock member 33 includes: a recessed groove (not illustrated); engagement portion (not illustrated); and an operation lever (not illustrated). The recessed groove has an entry opening through which the striker 32 can enter from above, and which allows the striker 32 to move upwards and downwards. The engagement portion engages with the striker 32 when the striker 32 has moved to the fixing position along the recessed groove. The engaged state (locked state) of the striker 32 with the engagement portion can be released by operating the operation lever.

In the lock mechanism 31 thus configured as described above, when the rear-edge side of the cabin 3 moves towards the fixing position, the striker 32 enters the recessed groove to be brought into contact with the floor of the recessed groove, and then engages with the engagement portion of the lock member. The cabin 3 is kept at the fixing position by the engagement between the striker 32 and the engagement portion. The release of the locked state of the locking mechanism 31, on the other hand, is carried out by operating the operation lever. When the engaged state of the striker 32 with the engagement portion of the lock member 33 is thus released, the rear-edge side of the cabin 3 becomes tiltable forwards. Note that the striker 32 and the lock member 33 are fixed respectively to the reinforcement member 13 and to the rear cab-mounting bracket 7, but, may also be attached respectively to the rear cab-mounting bracket 7 and to the reinforcement member 13.

As FIG. 2 shows, the cab under-members 4 each having a substantially U-shaped cross section and extending in the front-to-rear direction of the vehicle, respectively on the two sides, in the vehicle-width direction, of the cabin 3. Each of the cab under-members 4 includes: a front-side portion 36 which is disposed substantially horizontally on the front side of the vehicle; a rising portion 37 which is bent at the rear edge of the front-side portion 36 and then extends obliquely upwards; and a rear-side portion 38 which is bent at the upper edge of the rising portion 37 and then extends to the rear side of the vehicle substantially horizontally. The front-side portion 36 includes the rotationally-supporting portions 39 disposed at the front edge thereof, and is supported by the tilt shafts 6 of the front-cab mounts 5 respectively fixed to the front-side edges of the chassis-frame rails 2 so that the cab under-member 4 can tilt freely.

The cab under-members 4 are fixed to the cabin 3 in a way that the cab under-members 4 are brought into contact with the bottom surface of the floor panel 12 of the cabin 3, and that the contact portions are welded or joined in any other manner. Once each cab under-member 4 has been fixed to the floor panel 12, the front-side portion 36, the rising portion 37, and the rear-side portion 38 of the cab under-member 4 are respectively in contact with the front-side floor portion 16, the rising portion 17, and the rear-side floor portion 18 of the floor panel 12. In this state, the two edge portions, in the vehicle-width direction, of each of the front edge of the horizontal portion 26 and the upper edge of the bent portion 27, of the reinforcement member 13 are disposed in the vicinity of the cab under-members 4, respectively.

Subsequently, description will be given with reference to FIGS. 4 and 5 of the differences between a vehicle that does not employ the floor structure according to the present invention and a vehicle that employs the floor structure according to the present invention.

As FIG. 4 shows, the vehicle that does not employ the floor structure according to the present invention has a floor structure 41, which includes: a floor panel 42; and a reinforcement member 43.

The floor panel 42 includes: a front-side floor portion 44 on the top surface of which a seat 51 can be arranged; a first rising portion 45 which is bent at the rear edge of the front-side floor portion 44 and then extends obliquely upwards; a bed supporting portion 46 which is bent at the upper edge of the first rising portion 45 and extends rearwards, and on which a bed 52 can be mounted; a second rising portion 47 which is bent at the rear edge of the bed supporting portion 46 and then extends obliquely upwards; and a rear-side floor portion 48 which is bent at the upper edge of the second rising portion 47 and then extends rearwards. In addition, a power source 53, such as an engine, is disposed under the front-side floor portion 44 and the bed supporting portion 46.

The reinforcement member 43 has a substantially L-shaped cross section, and includes: a horizontal portion 49 that is a substantially plate-shaped portion provided so as to extend substantially horizontally; and a bent portion 50 which is bent at the rear edge of the horizontal portion 49 and then extends obliquely upwards. The width, in the vehicle-width direction, of the reinforcement member 43 is substantially the same as the width, in the vehicle-width direction, of the floor panel 42. The front edge of the horizontal portion 49 and the upper edge of the bent portion 50 are respectively fixed, by welding, by being fastened with bolts, or by other means, to the bottom surface of the bed supporting portion 46 and the bottom surface of the rear-side floor portion 48. With the reinforcement member 43 fixed to the floor panel 42, a structure with a closed cross-section is formed between the second rising portion 47 and the reinforcement member 43, and extends in the vehicle-width direction. With the reinforcement member 43 thus disposed, an increase in the torsional stiffness of the cabin 3 as a whole can be expected.

With the floor structure 41, however, a space needs to be secured behind the second rising portion 47 for the purpose of disposing the reinforcement member 43. For this reason, the width dimension, in the front-to-rear direction of the vehicle, of the bed supporting portion 46, that is, the width dimension, in the front-to-rear direction of the vehicle, of the bed 52 may possibly be shortened in some cases. Such a shorter width dimension lowers occupant comfort on the bed 52.

Such inconvenience can be avoided by expanding the area in which the bed can be mounted so as to include not only the bed supporting portion 46 but also the rear-side floor portion 48. However, although the bed supporting portion 46 and the rear-side floor portion 48 are connected to each other by the second rising portion 47, the bed supporting portion 46 has its attachment surface on which the bed is mounted positioned at a different level from the level of an attachment surface of the rear-side floor portion 48 on which the bed is to be mounted. Accordingly, to make the top surface of the bed uniform, the portion of the bed that is mounted on the rear-side floor portion 48 has a smaller thickness (width in the height direction) than the thickness of the portion of the bed that is mounted on the bed supporting portion 46. For this reason, the cushioning performance of the bed (sleeping comfort), such as the elasticity and the ability to recover the original form of the bed, depends on which position on the top surface of the bed, to be pressed. As a consequence, it is difficult to make sure of occupant comfort on the bed.

In contrast, as FIG. 5 shows, in the floor structure 11 according to the present invention, the bed 23 is mounted on the rear-side floor portion 18 that is disposed in the vehicle-width direction behind the seat 21. The reinforcement member 13 is disposed under the rear-side floor portion 18 so as to be opposed to the bottom surface of the rear-side floor portion 18. The structure with the closed cross-section is thus defined by and formed between the reinforcement member 13 and the rear-side floor portion 18. Accordingly, the structure thus formed with the closed cross-section and extending in the vehicle-width direction has a relatively large width in the front-to-rear direction of the vehicle, so that a further increase in the torsional stiffness of the cabin 3 as a whole can be expected.

In addition, the reinforcement member 13 that defines and forms the structure with the closed cross-section together with the rear-side floor portion 18 is disposed under the rear-side floor portion 18 on which the bed 23 is mounted. Accordingly, the position where the reinforcement member 13 is disposed has no influence on the width dimension, in the front-to-rear direction of the vehicle, of the rear-side floor portion 18, that is, on the width dimension, in the front-to-rear direction of the vehicle, of the bed 23. For this reason, it is possible to secure the width dimension, in the front-to-rear direction of the vehicle, of the bed 23. As a consequence, occupant comfort on the bed 23 can be improved.

In addition, since the rear-side floor portion 18 on which the bed 23 is mounted is bent at the upper edge of the rising portion 17 and then extends rearwards, the bed 23 can have a uniform thickness. Accordingly, the cushioning performance of the bed 23 (sleeping comfort), such as the elasticity and the ability to recover the original form of the bed, can be made uniform. As a consequence, it is possible to make sure of the occupant comfort on the bed 23.

As FIG. 4 shows, in the floor structure 41, the power source 53 is disposed directly under the bed supporting portion 46, so that the noise produced by the power source 53 and from the tires while the vehicle is travelling is transmitted to the bed 52 via the bed supporting portion 46. Accordingly, occupant comfort on the bed 52 is lowered.

In contrast, as FIG. 5 shows, in the floor structure 11 according to the present invention, the structure with the closed cross-section is defined by and formed between the reinforcement member 13 and the bottom surface of the rear-side floor portion 18 on which the bed 23 is mounted. Accordingly, the noise which is produced by the power source 9, such as an engine, disposed under the floor panel 12 and by tires 61 (see FIG. 1) while the vehicle is travelling and which is to be transmitted is, firstly, blocked effectively by the reinforcement member 13, and then arrives at the bed 23 via the rear-side floor portion 18. For this reason, the level of the noise transmitted to the bed 23 can be lowered down. Accordingly, occupant comfort on the bed can be improved. In addition, it is not necessary to provide a separate member, such as a board, below the rear-side floor portion 18 for the purpose of preventing the transmission of the noise. Accordingly, a reduction in the number of component parts can be expected.

As described above, according to the present invention, with only a simple configuration, the torsional stiffness of the cabin as a whole can be reliably increased and occupant comfort on the bed can be reliably improved.

In addition, the tiltable cabin 3 is connected by the striker 32 to the chassis-frame rails 2 so as to engage with and disengage from the chassis-frame rails 2, and the striker 32 is provided in the reinforce member 13 that is disposed on the rear-edge side of the floor panel 12. More specifically, since the striker 32 is provided to the reinforcement member 13 capable of increasing the torsional stiffness of the cabin 3 as a whole by being joined to the floor panel 12, the strength with which the striker 32 is attached to the cabin 3 can be reliably increased.

The reinforcement member 13 to which the striker 32 is provided is formed as a separate body from the floor panel 12. Accordingly, only the plate thickness of the reinforcement member 13 can be set to be large enough to satisfy the support strength of the striker 32 without provoking any increase in the thickness of the floor panel 12.

The embodiment employing the present invention made by the inventor has been described thus far, but the present invention is not limited by any of the description and the drawings of the embodiment that form parts of the disclosure of the present invention. To put it differently, all the other embodiments, examples, and operation techniques that are to be made by those skilled in the art on the basis of this embodiment are naturally all included in the scope of the present invention.

INDUSTRIAL APPLICABILITY

The floor structure of a cabin of the present invention is suitable for using in a vehicle equipped with a bed behind the driver's seat.

The invention claimed is:

1. A floor structure of a cabin disposed on a chassis frame and equipped with a bed behind a driver's seat, the structure comprising:
   a floor panel; and
   a reinforcement member,
   wherein the floor panel includes:
   a front-side floor portion that extends rearwards from a bottom portion of a front edge of the cabin and includes a seat-attachment portion supporting the seat from below;
   a rising portion that is bent at the rear edge of the front-side floor portion and extends upwards; and
   a rear-side floor portion that is bent at the upper edge of the rising portion and extends rearwards, and that includes a bed-attachment portion on which the bed is mountable, and
   the reinforcement member comprises a horizontal portion which is opposed to the bottom surface of the rear-side floor portion and extends in a front to rear direction of a vehicle substantially underneath the rising portion and substantially underneath the bed-attachment portion, and is joined to a middle portion of the bottom surface of the bed-attachment portion and at least any one of the bottom surface of the front-side floor portion and the rear surface of the rising portion so that the reinforcement member defines and forms a structure having a closed cross-section together with the rear-side floor portion in a vehicle-width direction.

2. The floor structure of a cabin according to claim 1,
   wherein the bottom portion of the front edge of the cabin is rotatably supported by the front-edge portion of the chassis frame, and
   the reinforcement member includes a lock mechanism that connects the cabin to the chassis frame so that the cabin is engageable with and disengageable from the chassis frame freely.

3. The floor structure of a cabin according to claim 1,
   wherein the
   horizontal portion is substantially plate-shaped and is affixed to the rear surface of the rising portion in a proximity of the front-side floor portion; and the reinforcement member further comprises:
   a bent portion which extends upward from a rear portion of the horizontal portion and is affixed to the middle portion of the bottom surface of the bed-attachment portion.

4. The floor structure of a cabin according to claim 1,
   wherein the horizontal portion is substantially plate-shaped and is joined to the at least one of the bottom surface of the front-side floor portion and the rear surface of the rising portion, and the reinforcement member further comprises:
   a bent portion which extends upward from a rear portion of the horizontal portion and is affixed to the middle portion of the bottom surface of the bed-attachment portion; and
   a lock mechanism that is affixed to a rear surface of the bent portion and connects the cabin to the chassis frame to engage and disengage the cabin from the chassis frame.

* * * * *